United States Patent
Harth et al.

(10) Patent No.: US 6,331,981 B1
(45) Date of Patent: Dec. 18, 2001

(54) METHOD AND NETWORK COMPONENT FOR SWITCHING LOW BIT RATE CONNECTIONS BETWEEN INPUT MODULES AND OUTPUT MODULES IN A COMMUNICATION NETWORK

(75) Inventors: Arno Harth, Wolfratshausen; Petra Tippmann-Krayer, Freising; Peter Holzner, Germering; Werner Korte, Munich; Karl Schrodi, Geretsried; Andreas Klug, Kirchheim, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/158,061

(22) Filed: Sep. 22, 1998

(30) Foreign Application Priority Data

Dec. 23, 1997 (DE) ............................................. 197 57 598

(51) Int. Cl.[7] ...................................... H04L 12/56

(52) U.S. Cl. ................................ 370/395.1; 370/395.61; 370/396

(58) Field of Search .............................. 370/395.1, 389, 370/396–9, 395.61, 395.64, 532, 535, 536–41, 543

(56) References Cited

U.S. PATENT DOCUMENTS

| | | |
|---|---|---|
| 5,301,189 | 4/1994 | Schmidt et al. . |
| 5,561,661 * | 10/1996 | Edmaier et al. ...................... 370/394 |
| 5,854,789 * | 12/1998 | Lesch et al. .......................... 370/395 |

FOREIGN PATENT DOCUMENTS

| | | |
|---|---|---|
| WO 95/17789 | 6/1995 | (WO) . |
| WO 95/34977 | 12/1995 | (WO) . |

OTHER PUBLICATIONS

"Mobile Access to an ATM Netowrk Using a CDMA Air Interface," McTiffin et al., IEEE Journal on Selected Areas in Communications, vol. 12, No. 5 (1994), pp. 900–908.

"Performance Analysis of Two Echo Control Designs in ATM Networks," Tsai et al., IEEE/ACM Transactions on Networking, vol. 2 No. 1 (1994), pp. 30–39.

"Evolution der Netze mit Atm," Händel, telcom report, vol. 17, No. 1 (1994) pp. 8–11.

"Evolution Towards UMTS," Oudelaar PIMRC 94, 5th IEEE Int. Symp. on Personal, Indoor and Mobile Radio Communications, Sep. 1994, pp. 852–856.

Pacing in UMTS, Lenti et al., RACE Mobile Telecommunications Workshop, vol. 1, May 17–19, 1994, pp. 405–410.

* cited by examiner

Primary Examiner—David R. Vincent
(74) Attorney, Agent, or Firm—Schiff Hardin & Waite (57) ABSTRACT

In a method and network component of a communications network for switching connections of low bit rate between input modules and output modules, the input modules and the output modules form a first switching level, and an ATM switching stage arranged between the input modules and the output modules forms a second switching level. In the first switching level, a number of low bit rate connections at the input module, which are to be transmitted to the same output module, are respectively merged by the input module into at least one ATM connection. In the second switching level, the switching through of the ATM connections for transmitting data in ATM cells ensues by the ATM switching stage. Subsequently, in the first switching level, the ATM connections which have been switched through are converted by the output module into the low bit rate connections. The combined switching in two switching levels represents an especially economical solution for functions specific to mobile radio and switching applications dealing with low bitrate traffic, by simultaneously assuring an acceptable speech quality with good exploitation of the ATM bandwidth.

25 Claims, 6 Drawing Sheets

METHOD AND NETWORK COMPONENT FOR SWITCHING LOW BIT RATE CONNECTIONS BETWEEN INPUT MODULES AND OUTPUT MODULES IN A COMMUNICATION NETWORK

BACKGROUND OF THE INVENTION

1. Field of the Invention

The present invention relates to a method as well as a corresponding network component, both used in a communications network, for switching connections with a low bit rate between input modules and output modules of the network component.

2. Description of the Prior Art

In communications networks such as mobile radio networks or stationary networks, information—e.g. traffic information or signaling information in speech transmission—is transmitted with low transmission rates via lines between network components by means of TDMA (Time Division Multiplex Access). Thus, PCM30 or PCM24 terminal lines can be employed. For hardwired information transmission—in stationary networks, but also in mobile radio networks, especially of the next generation—ATM (Asynchronous Transfer Mode) transmission, due to its advantages regarding broadband applications, is gaining increasing acceptance. Nevertheless, narrowband information transmission via connections with a low bit rate—e.g. TDM connections—remains an important application for the majority of the mobile or stationary network subscribers. Therefore, when the TDM multiplex technology is converted or translated into ATM transmission technology in a network component, a large delay usually arises— e.g. 8 msec given 8 kbit/sec speech transmission. This leads to a degradation of the speech quality.

In principle, a conversion procedure from TDM multiplex technology into ATM transmission technology does exist which leads only to small delays—e.g. by filling the ATM cells with only a few bytes—however, this results in an uneconomical use of the ATM bandwidth. For this reason, it has long been a problem to realize network components of a telecommunications network so that they distribute the traffic internally via an ATM switching means and simultaneously support TDM traffic with a low bit rate at the external lines.

SUMMARY OF THE INVENTION

It is an object of the present invention to provide a method and a network component for switching connections with a low bit rate on the basis of ATM, by means of which method or component a lowest possible delay time and a high utilization ratio of the available ATM bandwidth are simultaneously achievable.

This object is inventively achieved in a method and network component for switching connections with a low bit rate between input modules and output modules of the network component in a communications network, wherein the input modules and the output modules inventively form a first switching level and an ATM switching stage arranged between the input modules, and the output modules forms a second switching level. In the first switching level, a number of low bit rate connections at the input module, which are to be transmitted to the same output module, are merged by the input module into at least one ATM connection. In the second switching level, the switching through of the ATM connections ensues by the switching stage for transmission of information in ATM cells. Additionally in the first switching level, the switched through ATM connections of one or more input modules are converted by the output module into the low bit rate connections.

By dividing the switching process into two levels, a number of connections are forwarded together in the same ATM connection, so that a low delay and a good utilization of the ATM cell capacity are advantageously achieved. The combined switching in two switching levels represents a particularly economical solution for functions specific to mobile radio and switching applications dealing with low bitrate traffic, simultaneously assuring an acceptable speech quality with good exploitation of the ATM bandwidth. The employment of multilevel switching in an ATM switching means and in input and output modules arranged separately therefrom harmonizes two opposing aspects—namely, the delay by the conversion of connections of low bit rate into ATM technology is minimized, and the exploitation of the ATM bandwidth is increased. The concept of decentralized switching in two levels has the advantage that the switching processes can be performed in the same, or substantially the same manner, not only in the input and output modules, but also in the ATM switching means. Furthermore, an adjustment of the software and hardware in the switching levels is possible using a switching controller in a simple and low-cost fashion.

In an embodiment of the invention, a common control unit takes over the control of the functions not only in the first switching level but also in the second switching level. It is particularly advantageous if the ATM switching unit is driven according to a decentralized switching principle and has a control arrangement which effects adjustments in the input modules and the output modules of the first switching level. The uniform controlling of the first and second switching levels can be realized with low hardware and software outlays.

The bi-level method for switching can be applied according to alternative embodiments of the invention, regardless of whether external lines are respectively connected at the input modules and the output modules of the first switching level, via which lines data packets (information) are received and transmitted by time division multiplex connections—e.g. TDM connections—or if external ATM lines are respectively connected at the input modules and output modules of the first switching level, over which lines data packets (information) from a number of connections are received and transmitted in a structured fashion in a time division multiplex frame—e.g. TDM frame—or in ATM minicells.

According to other embodiments of the invention, different techniques can perform the narrowband switching in the first switching level. Two of those techniques are based on the collection of minipackets in ATM cells, wherein a selection is made, using a connections table in the input module or in the output module, as to which minipacket is inserted into which ATM cell, or which minipacket is distributed to which connections of the output module. Three methods follow the principle of first merging the connections—e.g. TDM connections—at common outputs and subsequently converting these connections into the packet connections, which is the same as entering the information into the ATM cells. This process has the advantage that up to a five-times lower delay and simultaneously at least twice as high a utilization of the available bandwidth are obtainable, compared to the two techniques initially described.

The switching in two levels preferably relates to traffic connections of low bit rate (since these constitute the majority of connections which occur); however, it can also be applied to signaling connections and to operations and maintenance connections (O&M, Operations & Maintenance).

DESCRIPTION OF THE PREFERRED EMBODIMENTS

Figure 1:
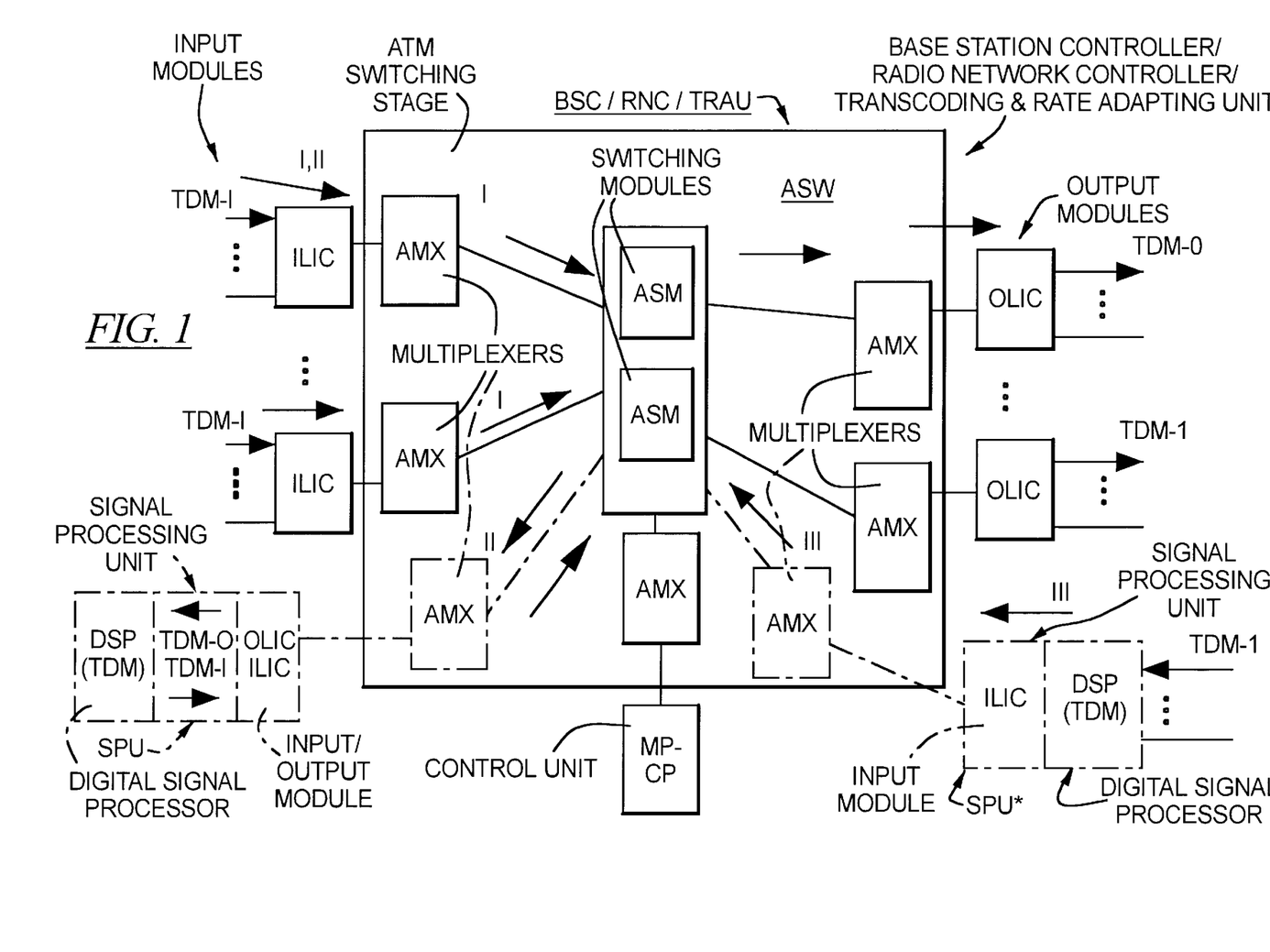
FIG. 1 is the block diagram of a network component, constructed and operating in accordance with the invention, for producing switching connections in two switching levels for one transmission direction of the connection path.

FIG. 1 shows the block diagram of a network component for inventively switching connections in two switching levels for one transmission direction of the connection path. The return direction runs parallel to the depicted transmission direction, so that the subsequent embodiments are correspondingly valid for the return direction as well. The network component in the example is a base station controller BSC or a radio network controller RNC which, as part of a GSM mobile radio network or of a universal mobile telecommunications system (UMTS) or networks, takes over checking and controlling tasks related to radio operation and transmission/reception, especially the checking of base stations. The network component may alternatively be a transcoding and rate adaptation unit (TRAU) which, as is well known, performs an adjustment, per channel, in the GSM mobile radio network of the different transmission speeds between the base station controller BSC or the radio controller RNC and an exchange MSC connected thereto, as well as performing the transcoding function.

FIG. 1 depicts the basically identical functional structure for switching the connections for any of these network components BSC, RNC, TRAU, without considering in detail the unimportant functions of the respective network components, which functions are known. An application of the inventive switching, characterized by two switching levels, is also possible in the mobile exchange. The invention is not limited to network components of a mobile radio network, but can, in principle be employed in any network component which exercises functions specific to hardwired networks or mobile radio—such as switching, checking, and transcoding tasks, etc.—and thus internally guides the traffic via ATM transmission technology and, at external lines, supports traffic at a low bit rate—e.g. via TDM connections.

Proceeding from an ATM switching principle, it is possible with the invention described herein to construct network components which perform the functions cited above as examples. To this end, the network component BSC/RNC/TRAU includes an ATM switching stage ASW, preferably formed by a number of modules ASM (ATM Switching Module with e.g. 5 Gbps), and a number of ATM multiplexers AMX. Line modules (Line Interface Circuits) and a control unit MP-CP are connected with the ATM switching stage ASW via a multiplexer AMX. The line modules perform the function of an input module ILIC or of an output module OLIC independently of whether it is arranged in the transmission path at the input or the output side. In principle, each line module includes the function of one input module ILIC and one output module OLIC. Thus, a number of connections TDM-I at the input side are respectively merged by input modules ILIC and forwarded or relayed via the multiplexer AMX to the ATM switching stage ASW—in the direction I in the example depicted. The efficiency of the narrowband multiplexing at the input modules ILIC can be increased, in that a high number of connections TDM-I, e.g. eight connections, are selected per module.

The ATM switching stage ASW forms the second of the two switching levels according to the invention, meaning it functions according to the decentralized switching principle, in which the connection paths are defined by connection tables in the input modules ILIC and output modules OLIC, these being connected with the ATM switching stage ASW at the input side and at the output side, respectively. The input modules ILIC and the output modules OLIC form the first of the two switching levels according to the invention. In the first switching level, a number of low bit rate connections TDM-I at each of the two depicted input modules ILIC, which are to be transmitted to the same output module OLIC (see thick arrows), are merged by the respective input module ILIC into at least one ATM connection. External lines, e.g. PCM-30 lines, conduct the data of the low bit rate connections TDM-I, which, according to the TDMA method, are contained in a number of time-slots of a TDM frame.

In the second switching level, the switching through of the ATM connections for transmitting information in ATM cells ensues by the ATM switching stage ASW. Subsequently, in the first switching level, the ATM connections which have been switched through at the output module OLIC and which come from one or more input modules ILIC are converted by the output module OLIC into low bit rate connections TDM-O. By the switching process being inventively split into two levels, one or more TDM connections of an input module ILIC, at the input side of the switching stage ASW, are transmitted together in the same ATM connection and are allocated at the output side to only one output module OLIC, so that a low delay and a good utilization of the ATM cell capacity advantageously result. A number of ATM connections of different input modules ILIC can also converge, given the same output module OLIC. The combined switching in two switching levels represents an especially economical solution which simultaneously assures an acceptable speech quality with good exploitation of the ATM bandwidth. The inventive use of the multilevel switching in an ATM switching stage ASW and in input and output modules ILIC and OLIC arranged separately therefrom harmonizes two opposing aspects—namely, to minimize the delay by the conversion of connections of low bit rate into ATM technology, and to increase the exploitation of the ATM bandwidth. The concept of decentralized switching in two levels has the advantage that the switching processes not only in the input/output modules, but also in the ATM switching stage ASW, can be performed similarly or in the same manner. This bi-level switching method is also applicable when the input module ILIC and the output module OLIC are connected at external ATM lines which transmit the data in a structured fashion either in a TDM frame structure or as ATM minicells (according to AAL 2, ATM Adaption Layer 2 minicells).

Control means for processing connections (call processing) can be distinguished from control means for signaling or for O&M tasks. The switching functions of the first switching level and the second switching level are taken over by the control unit MP-CP (Main Processor for Call Processing) which is coupled with the ATM switching stage. This has the advantage that, due to the decentralized switching principle, the control unit MP-CP need only conduct adjustments at the input module ILIC and at the output module OLIC in order to control not only the first level, but also the second level. If each of the three switching units were left independent—i.e. corresponding to a network of switching nodes—then, per signaling, three control units would have to co-ordinate their actions for each connection. This is eliminated by employing one processor which executes the entire controlling task. This unified control can be realized with low hardware and software outlay and can be adapted to future modifications in a simple and low-cost fashion.

For the embodiment of the network components as base station controller/radio network controller BSC/RNC with an additional function of supporting of a data transmission according to packet data service GPRS (General Packet Radio System), the arrangement can be expanded (indicated by the dashed-dotted line) by a signal processing unit (SPU). The signal processing unit SPU, which is likewise connected at the module ASM via a multiplexer AMX, has at its disposal a line module which, as an output module OLIC, converts arriving ATM cells into TDM connections TDM-O, and, as an input module ILIC, converts incoming TDM connections TDM-I into ATM cells. Beyond this, the signal processing unit has a digital signal processor DSP for processing TDM-oriented functions—in the framework of the GPRS service—on the basis of the information contained in the TDM connections. For the case when the GPRS service is served by the base station controller BSC or radio network controller RNC, the connection initially proceeds from an input module ILIC (see arrow I, marked in bold) via the ATM switching stage ASW into the signal processing unit SPU (see arrow II, marked in bold), and then, following the signal processing, from the signal processing unit SPU (see arrow II, marked in bold) once again via the ATM switching stage ASW into the output module OLIC. In the embodiment of the invention with a transcoding unit TRAU as the network component, the above is correspondingly valid, but the signal processing unit SPU is not optionally connected depending on an whether additional function is needed, but instead is always in the transmission path, and is operated as a transcoding module for performing transcoding functions.

An alternative to the double passage of a data signal through the ATM switching stage ASW for the abovementioned purposes, is to replace the input module ILIC and the signal processing unit SPU in the transmission path II by a single signal processing unit SPU*. This likewise has a digital signal processor DSP for TDM signal processing as well as a line module performing the function of an input module ILIC, so that the data on the TDM connections TDM-I at the input side can be immediately processed before conversion into ATM cells, and the switching to the output module OLIC via the ATM switching means ASW follows (see arrow III, marked in bold).

Figure 2:
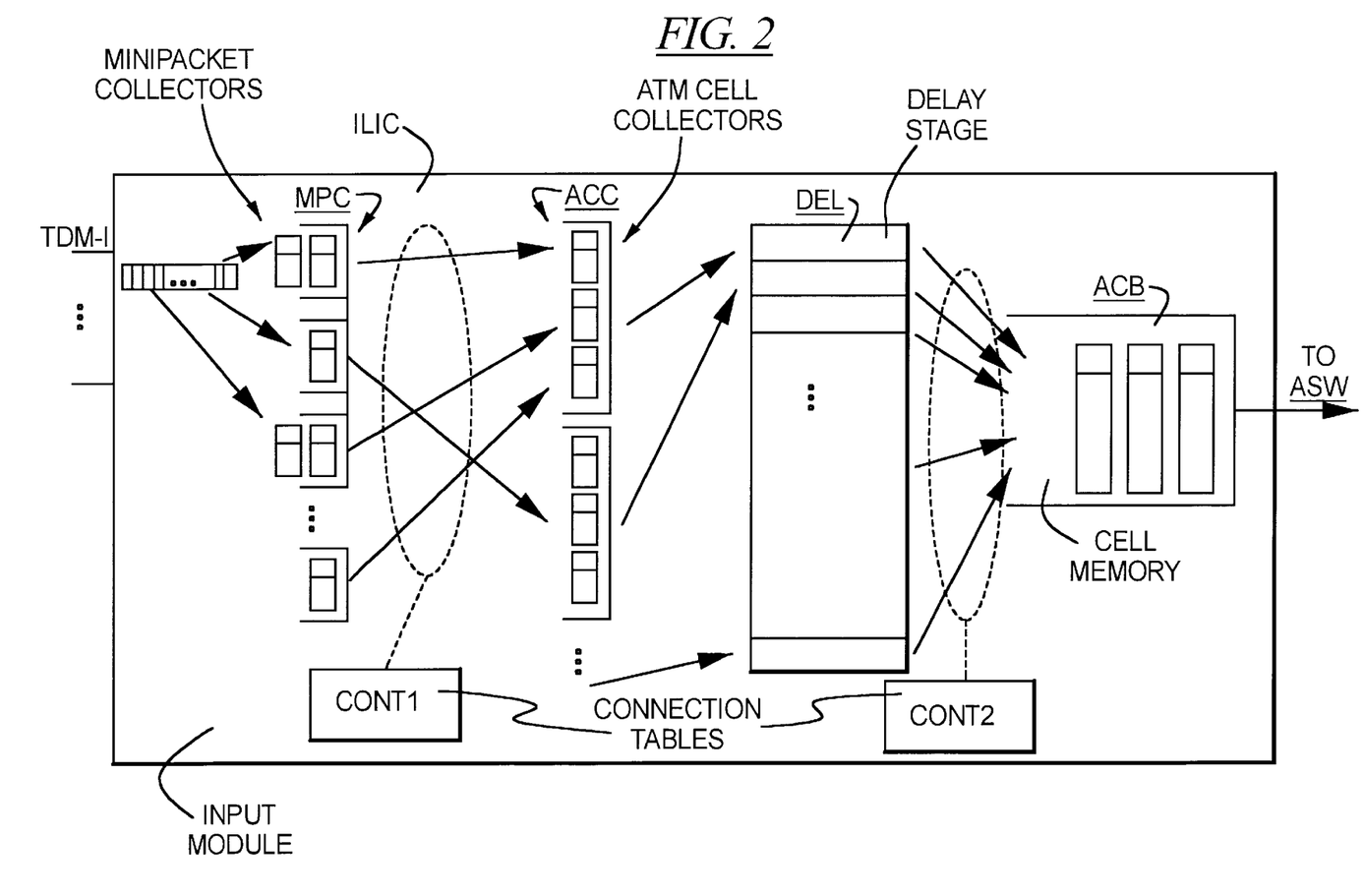
FIG. 2 is a block diagram of an input module for switching the connections in the first switching level based on the collection of minipackets in ATM cells.
Figure 3:
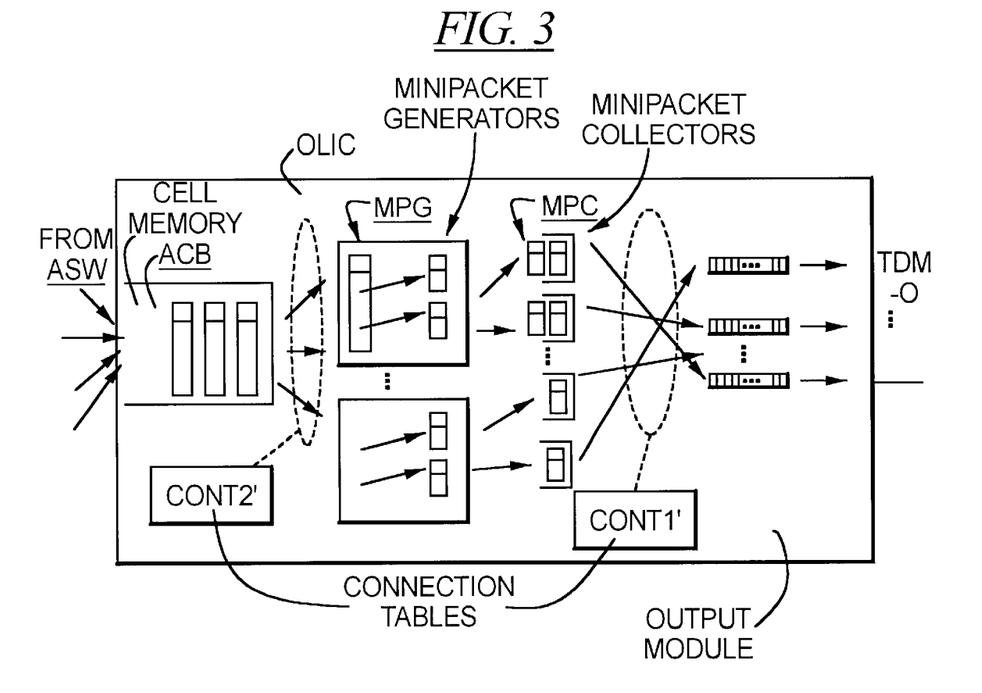
FIG. 3 is a block diagram of an output module for switching the connections in the first switching level based on the collection of minipackets in ATM cells.

FIG. 2 and FIG. 3 respectively show block diagrams of an input module ILIC and an output module OLIC for switching the connections in the first switching level on the basis of the collection of minipackets in ATM cells. FIG. 2 shows the transmission path of the data signal in the input module ILIC from the connections TDM-I arriving at the input side to the ATM cells exiting at the output side which are forwarded to the ATM switching stage ASW. FIG. 3 analogously shows the transmission path of the data signal in the output module OLIC from the ATM cells arriving at the input side to the connections TDM-O exiting at the output side.

Out of the incoming TDM bit stream, minipackets are formed and collected in minipacket collectors MPC, wherein, for every connection (e.g. a traffic connection for speech transmission) a minipacket collector MPC of identical type is available. Minipackets consist of a packet header and a packet base. The header of the minipacket contains at least the connection address for defining the respective connection. Security fields, data about the length of the minipacket, sequence numbers, etc. can also be contained. The connection data which are to be transmitted are contained in the base. The base of the minipacket is formed, in that, from every incoming TDM frame, those time-slots are collected which belong to the respective connection. The length of the base is a few bytes. The delay time is as low as in partially filled ATM cells. Since it is possible to simultaneously accommodate a number of minipackets in one ATM cell, there is the advantage of a better utilization of the transport capacity of the ATM cells. The format of the packet header of the minipacket preferably can be different. It can be a proprietary format or a format defined in the standard for the AAL 2. In case of the proprietary format the number of bits is lower or higher than that of the standardized AAL-2 header. The lower number of bits in the proprietary format is possible when fixed base lengths are selected and check sum bits are forgone, since the first switching level provides security. A header having an identical length with respect to the standardized AAL2 is also applicable, wherein the respective bits of the header comprise proprietary information.

From the collected minipackets, ATM cells can then be assembled in ATM cell collectors ACC. A connection table CONT1 defines which minipacket belongs in which ATM cell collector ACC. The control processor according to FIG. 1 conducts the entries and deletions in this table in the buildup and cleardown of connections. Parallel to this, this processor processes the other connection table CONT2 at the input module ILIC, the mirror-inverted connection table CONT2' on the output module OLIC (FIG. 3) and its connection table CONT1'. The first switching level is controlled by processing the connection table CONT1 and CONT1' and the second switching level is controlled by processing the connection table CONT2 and CONT2'. For the switching of the second switching level, for each ATM cell collector ACC, the controlling processor defines, in the connection table CONT2 of the input module ILIC, which output module OLIC the cell collector's ATM cells should be admitted. The information about the respective output module OLIC is contained in the ATM cell header. ATM cells leave the ATM cell collectors ACC when at least one of two conditions is satisfied. Either the ATM cell is full, or the maximum permissible filling time is reached. The permissible filling time must be adhered, because minipackets in the receiver must arrive within a certain range of fluctuation of the delay, but there is no assurance that a sufficient number of minipacket collectors MPC serve the ATM cell collector ACC to fill the cells fast enough.

After exiting the ATM cell collector ACC, the ATM cells pass through a delay stage DEL with random running time, the delay stage DEL being constructed in the simplest case as parallel delay elements for the ATM cells released by the ATM cell collectors ACC. This avoids a simultaneous emptying of their ATM cells by all ATM cell collectors ACC belonging to the input module ILIC into an ATM cell memory ACB connected downstream, from which cell memory ACB the further transmission into the ATM switching stage ASW ensues. A simultaneous output of ATM cells is an unwanted possibility, if, on the basis of the TDM transmission, all external TDM lines which are connected to the input module ILIC are synchronized not only as to cycle but also as to phase relative to the TDM frame. If the ATM cell memory ACB is not large enough, cells could be lost or the maximum permissible range of fluctuation of the delay can be exceeded. Therefore, the delay stage DEL with random running time is connected between the ATM cell collectors ACC and the ATM cell memory ACB.

At the output module OLIC, a number of ATM connections of different input modules ILIC (e.g. the two shown in FIG. 1) converge, switched by the ATM switching stage ASW. In an ATM cell memory ACB at the input side, the appertaining ATM cells are collected. Using the information in the ATM cell header, it is determined from which input module ILIC the ATM cells originate, and the ATM cells are distributed by means of the connection table CONT2' to a number of minipacket generators MPG. From the ATM cells, the minipackets in each minipacket generator are released and are stored intermediately in minipacket collectors MPC connected downstream. From there, a conversion of the minipackets into the connections TDM-O with TDM bit current ensues, such that the contents of the minipacket are connected to the respective externally connected output line with the corresponding time-slot. Data in the packet header of the minicells identify the correct destination. The connection table CONT1' on the output module OLIC provides for the right allocation among minipackets, i.e. between the minipacket collector MPC and the appropriate connection (time-slot and output line).

In principle, an individual ATM connection suffices to transport all the minipacket connections from the input module ILIC to a defined output module OLIC, even if TDM connections at the input side and TDM connections at the output side differ in location. In order to be able to distinguish the minipacket connections from one another, a sufficiently large address space is used which can be addressed by the header of the minipacket. In the standardized AAL 2 method, a maximum of 248 minicell addresses are available. If these are exhausted, another ATM connection is arranged between the input and output modules. As an alternative according to the proprietary format, the address space can be arranged much larger, or smaller.

Figure 4:
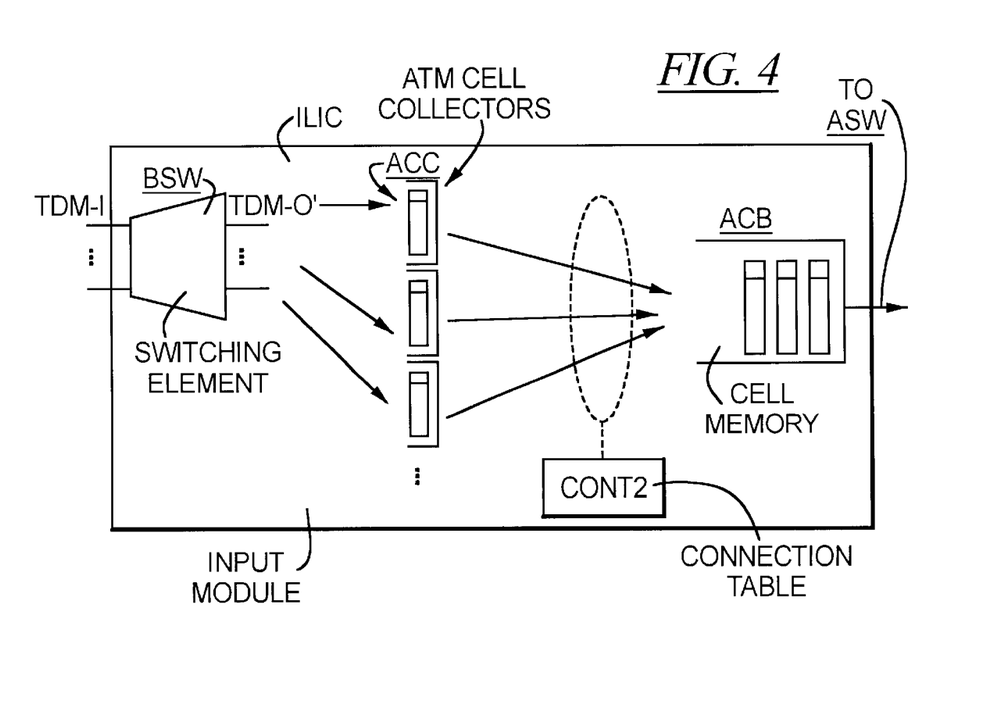
FIG. 4 is a block diagram of an input module for switching the connections in the first switching level based on the merging of TDM connections in ATM cells.
Figure 5:
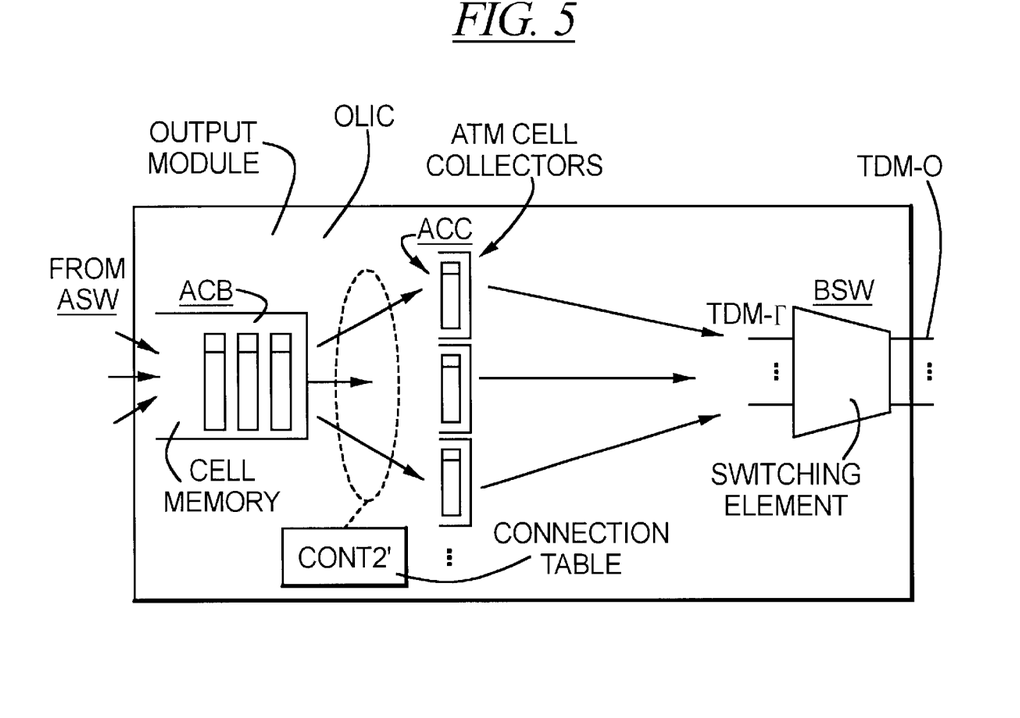
FIG. 5 is a block diagram of an output module for switching the connections in the first switching level based on the merging of TDM connections in ATM cells.

FIG. 4 and FIG. 5 respectively show block diagrams of an input module ILIC and an output module OLIC for switching the connections in the first switching level based on the merging of TDM connections in ATM cells. While the method according to FIG. 2 and FIG. 3 follows the principle of packeting TDM connections byte-by-byte, in the example according to FIG. 4 and FIG. 5, these are processed bit-by-bit. This has the advantage that the delay time is just as low as in conventional line-oriented (circuit switched) systems. At the same time, the exploitation of the available bandwidth is at least twice as high as in the type of method according to FIG. 2 and FIG. 3, since a minipacket header is not necessary to identify the narrowband connection, but rather the position in the TDM frame is used to this end. The narrowband switching at the input module ILIC as well as at the output module OLIC use a chronological and spatial position exchange whose result is again TDM frames. A TDM switching element BSW (Bit Switch) takes over this task. The switching element BSW at the input side, switches low bit rate connections TDM-I to low bit rate connections TDM-O', these former connections TDM-I being at the input side in the input module ILIC. The switching element BSW also switches, at the output side, low bit rate connections TDM-I' to low bit rate connections TDM-O, these former connections TDM-I' being at the input side in the output module OLIC.

Figure 6:
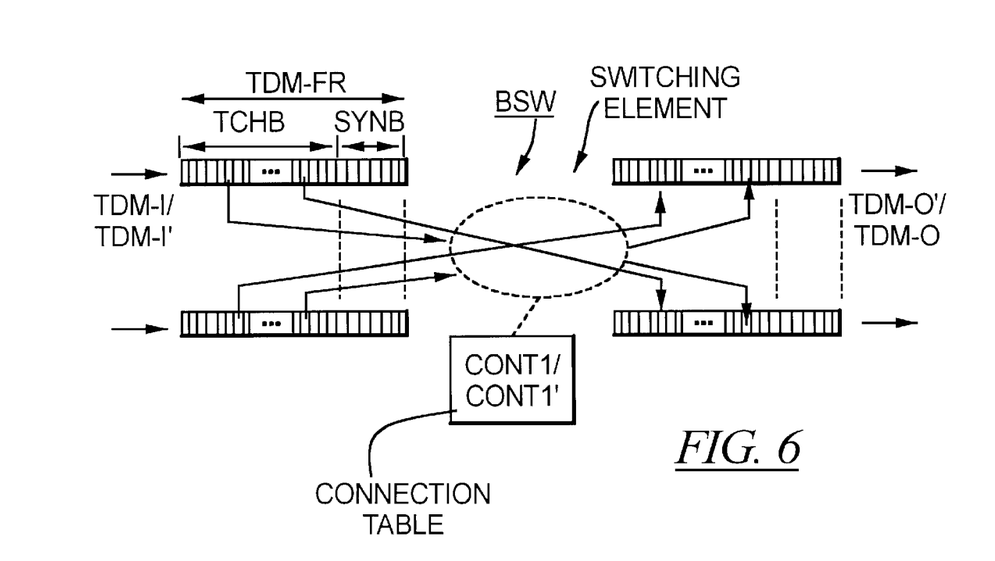
FIG. 6 illustrates the basic functioning of a TDM switching element for merging, at common outputs, the TDM connections belonging to the same output module.

This means that, according to FIG. 6, the TDM switching element BSW can switch each individual bit of a TDM frame TDM-FR, split into connection bits TCHB and synchronization bits SYNB. For example, in PCM transmission, a channel of 8 kbit/sec is represented by one bit per PCM frame, (frame cycle time 125 $\mu$sec). The TDM switching element BSW allocates all TDM connections TDM-I (or TDM-I') at the input, these connections belonging to the same output module, to one or more common outputs which direct the TDM connections TDM-O' (or TDM-O). A number of common outputs are necessary if more TDM connections are to be directed to the same output module than can be accepted by one TDM frame TDM-FR. For example, a PCM30 frame is able to transport a maximum of 240 submultiplex connections for every 8 kbit/sec. A connection table CONT1 provides for the abovementioned allocation of the TDM-I connections to the TDM-O' connections, while the connection table CONT1' effects allocation of the TDM-I' connections to the TDM-O connections within the TDM switching element BSW. These connection tables CONT1 and CONT1' are preferably controlled by a single control unit (MP-CP in FIG. 1).

According to FIG. 4, the information of the bit current, which is made available by the TDM switching element BSW, is condensed into ATM cells in the ATM cell collectors ACC which are connected downstream, these ATM cells being subsequently written in the ATM cell memory ACB using the connection table CONT2 for switching through the ATM connections in the ATM switching stage ASW. The second step, carried out in the input module ILIC following the multiplexing of the TDM connections, is to pack data at the outputs of the TDM switching element BSW into the ATM cells—the data having been conducted by the TDM connections. There are alternative procedures for this second step which are depicted in the FIG. 7 to FIG. 9.

According to FIG. 5, on the output module OLIC, the ATM connections of different input modules ILIC, switched via the ATM switching stage ASW, again converge. The appertaining ATM cells are collected in the ATM cell memory ACB at the input side. From there, the ATM cells are admitted into the respective ATM cell collectors ACC, wherein the allocation ensues in the output module OLIC by means of the connection table CONT2' used for switching through the ATM connection(s). Subsequently, a depacketing of the ATM cells arriving from the ATM cell collectors ACC is carried out, so that parallel bit currents of data are conducted to the respective input side TDM connections TDM-I' of the TDM switching element BSW and, corresponding to the depiction in FIG. 6, these bit currents are switched to the output side TDM connections TDM-O in the output module OLIC.

Figure 7:
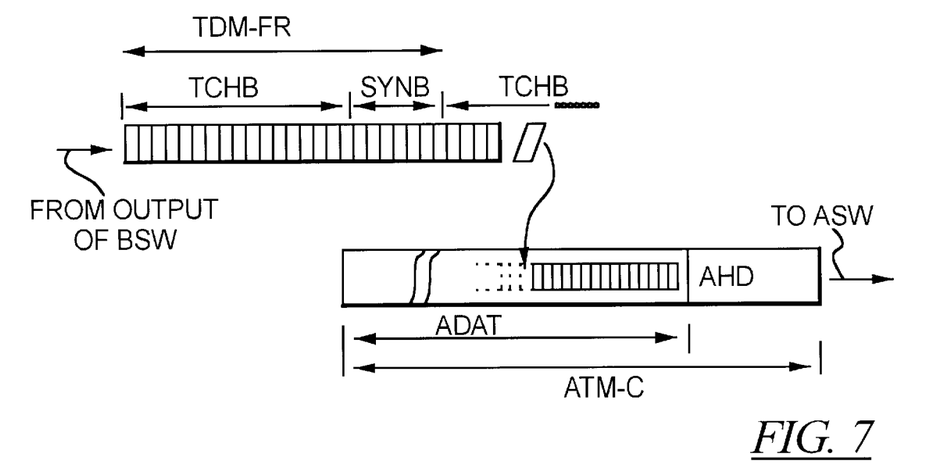
FIGS. 7–9 respectively illustrated different principles for filling the ATM cells with the information of the TDM connections.
Figure 8:
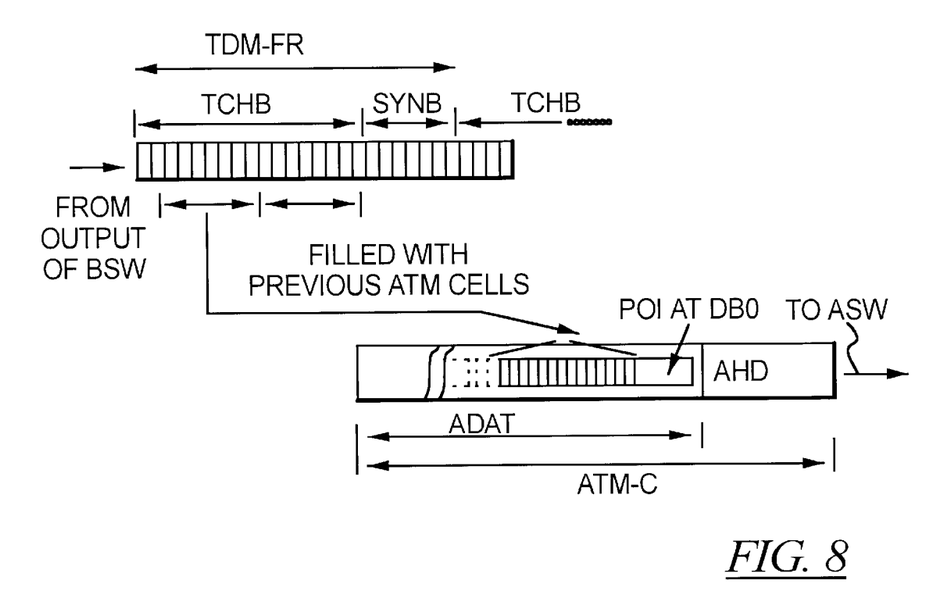
Figure 9:
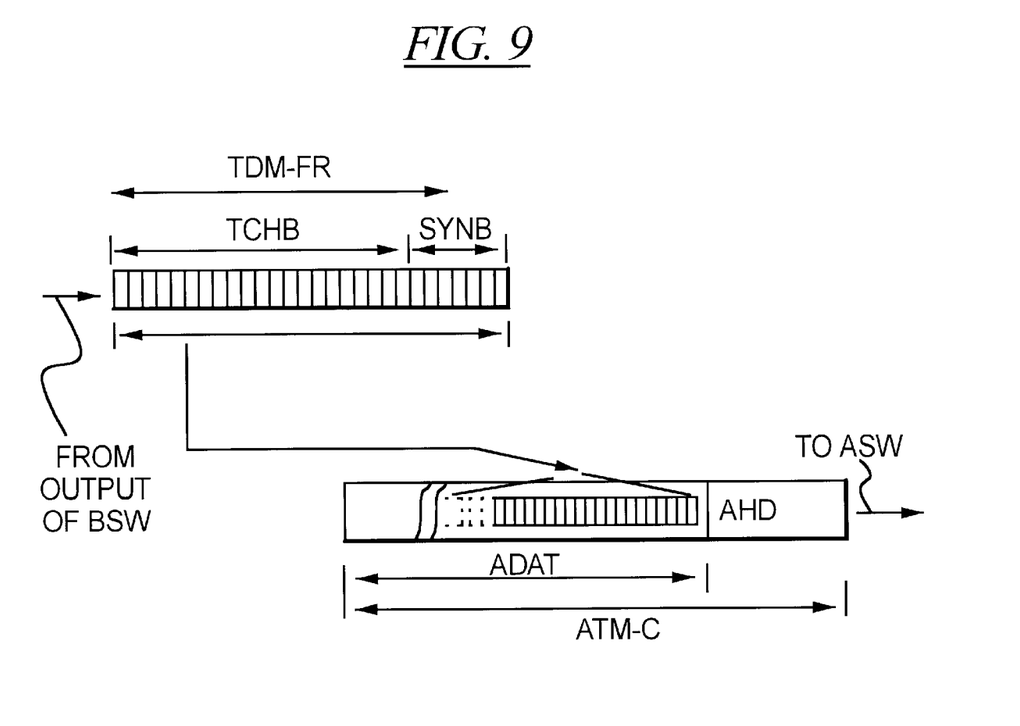

FIG. 7 to FIG. 9 show different procedures for filling the ATM cells with the data of the TDM connections. It is common to each of the procedures, that, from the respective output of the TDM switching element BSW, one or more TDM frames TDM-FR arrive with the connection bits TCHB and the synchronization bits SYNB, are entered in the ATM cell memory as ATM cells ATM-C, and are forwarded from there to the ATM switching stage ASW. A header field AHD and a data field ADAT are available to each ATM cell ATM-C.

In FIG. 7, the bits arriving from the TDM output are written into the ATM cell ATM-C in succession. As soon as the ATM cell is full it is sent out. Thus, it does not matter whether a bit belongs to a TDM connection for traffic data or for signaling data from the connection bits TCHB, or originates in the synchronization bit SYNB of the TDM frame TDM-FR. Therefore, there is no relation between the phase of the TDM frame and the position of the TDM data in the ATM cell. In this method, the packing of the TDM frames in ATM cells is simple, and the entire available ATM bandwidth is used.

In an alternative method according to FIG. 8, all TDM time-slots except for the synchronization time-slot are packed by means of AAL1 (ATM Adaption Layer 1) into the ATM cells. So that the reception side can recognize the position of the TDM timeslot within the ATM cell, a pointer POI is additionally inserted into every eighth ATM cell ATM-C, this pointer referring to the beginning of the TDM structure, recognizable at the first information byte DB0. For this case, the ATM cells ATM-C are designated as "structured AAL1 cells". The AAL 1 method provides that the ATM cells are periodically released. The period is matched to the data rate of the TDM output, such that every ATM cell is completely filled. This method thus completely exploits the available ATM bandwidth and simplifies the synchronization at the ATM reception side.

In another alternative method according to FIG. 9, each ATM cell ATM-C is formed by exactly one TDM frame TDM-FR. This is positioned in the ATM cell ATM-C such that its synchronization byte SYNB is always found at the same place. The ATM cells are also periodically sent out in this method, and the packing process takes the TDM frame structure into consideration. The ATM bandwidth is thus not completely exploited, however, the TDM synchronization at the ATM receiver side is accurately realizable and in addition functions as a carrier of the TDM low bit rate connections in the same way for PCM30 and PCM 24 terminal lines.

Although various minor modifications might be suggested by those skilled in the art, it should be understood that our wish to embody within the scope of the patent warranted hereon all such modifications as reasonably and properly come with the scope of our contribution to the art.

We claim as our invention:

1. A method for switching low bit rate connections between input and output modules connected to a network component in a communication network, comprising the steps of:

providing input and output modules with an ATM switching stage connected therebetween;

forming a first switching level comprising said input modules and said output modules;

forming a second switching level comprising said ATM switching stage;

in said first switching level, merging a plurality of low bit rate connections at said input module, which are all to be transmitted to one of said output modules, into at least one ATM connection;

in said second switching level, switching through said at least one ATM connection by said switching stage for transmission of information in ATM cells; and in said first switching level, converting said through-switched ATM connection in said one of said output modules into a low bit rate connection.

2. A method as claimed in claim 1 comprising the additional step of employing a common control means for controlling said first switching level and said second switching level.

3. A method as claimed in claim 2 comprising driving said ATM switching stage with said common control means according to a decentralized switching principle and with said common control means adjusting said input modules and said output modules in said first switching level.

4. A method as claimed in claim 1 wherein each of said input modules and said output modules has external lines respectively connected thereto, and wherein said input and output modules respectively receive and transmit data via said external lines by time-division multiplex connections.

5. A method as claimed in claim 4 wherein said input modules and said output modules respectively transmit and receive data via a plurality of connections using ATM minipackets, which are carried inside said ATM cells, and comprising the additional step of:

in said input modules in said first switching level, collecting said minipackets and forming ATM cells from the collected minipackets using a connection table to determine which minipackets are inserted into which of said ATM cells.

6. A method as claimed in claim 4 comprising the additional step of, in the respective input modules and the respective output modules of said first switching level, multiplexing and demultiplexing connections by a switching element with an allocation of connections between said input modules and said output modules being made using a connection table.

7. A method as claimed in claim 1 wherein each of said input modules and said output modules has external ATM lines respectively connected thereto.

8. A method as claimed in claim 7 wherein said input modules and said output modules respectively transmit and receive data via a plurality of connections using ATM minipackets, which are carried inside said ATM cells, and comprising the additional step of:

in said input modules in said first switching level, collecting said minipackets and forming ATM cells from the collected minipackets using a connection table to determine which minipackets are inserted into which of said ATM cells.

9. A method as claimed in claim 1 wherein each of said input modules and said output modules has external lines respectively connected thereto, and wherein said input modules and said output modules respectively transmit and receive data via a plurality of connections using ATM minipackets, which are carried inside said ATM cells.

10. A method as claimed in claim 9 comprising the additional step of:

in said input modules in said first switching level, collecting said minipackets and forming ATM cells from the collected minipackets using a connection table to determine which minipackets are inserted into which of said ATM cells.

11. A method as claimed in claim 10 comprising the additional step of:

passing said ATM cells through a delay arrangement having random transit times, in an input module of said first switching level and subsequently storing said ATM cells intermediately in an ATM cell memory before transmitting said ATM cells to said ATM switching stage in said second switching level.

12. A method as claimed in claim 9 comprising forming each minipacket with a packet header containing at least one connection address, said packet header having a format selected from the group consisting of a proprietary header format and a standardized header format.

13. A method as claimed in claim 9 wherein, in said output modules of said first switching level, said ATM cells are collected and ATM minipackets are generated from the collected ATM cells and intermediately stored, and employing a connection table to determine which minipackets are distributed to which connections of said output module.

14. A method as claimed in claim 1 comprising the additional step of, in the respective input modules and the respective output modules of said first switching level, multiplexing and demultiplexing connections by a switching element with an allocation of connections between said input modules and said output modules being made using a connection table.

15. A method as claimed in claim 14 comprising the additional step of:
in said input modules, forming ATM cells from data multiplexed at common outputs and intermediately storing said ATM cells in an ATM cell memory before transmitting said ATM cells to said ATM switching stage of said second switching level.

16. A method as claimed in claim 15 comprising the additional step of:
filling said ATM cells with data arriving at a common output being written in succession into said ATM cells independently of whether said data comprises traffic information or signaling information.

17. A method as claimed in claim 15 comprising the additional step of:
filling said ATM cells as structured ATM cells with data arriving at a common output containing a pointer identifying a beginning of each structure.

18. A method as claimed in claim 15 comprising the additional step of:
partially filling said ATM cells with data arriving at a common output with each ATM cell containing synchronization data.

19. A method as claimed in claim 14 comprising the additional step of:
in said output modules of said first switching level, intermediately storing incoming ATM cells in an ATM memory and subsequently collecting said ATM cells before transmitting said ATM cells to said switching element.

20. A method as claimed in claim 14 wherein said connection table comprises a first connection table, and comprising the additional step of:
using a second connection table, selecting at one of said input modules which of said ATM cells are switched through to which of said output modules by said ATM switching stage of said second switching level.

21. A method as claimed in claim 20 comprising the additional step of:
using a third connection table, determining at one of said output modules how said ATM cells are to be distributed.

22. A network component for a communication network comprising:
a first switching level comprising a plurality of input modules and a plurality of output modules;
means in at least one of said input modules of said first switching level for merging a plurality of low bit rate connections at said at least one input module which are to be transmitted to one of said output modules, into at least one ATM connection;
forming a second switching level comprising an ATM switching stage connected between said input modules and said output modules, said ATM switching stage comprising means for switching through connections between said input modules and said output modules; and
means in at least one of said output modules of said first switching level for, upon receipt of a switched-through connection from said switching stage of said second switching level, converting the switched-through ATM connection into an output low bit rate connection.

23. A network component as claimed in claim 22 comprising a mobile radio network component.

24. A network component as claimed in claim 23 wherein said network component comprises a mobile radio network component selected from the group consisting of a base station control unit, a radio network controller and a transcoding unit.

25. A network component as claimed in claim 22 comprising a hardwired network component.

\* \* \* \* \*